United States Patent
Strunk

(10) Patent No.: US 7,305,231 B2
(45) Date of Patent: Dec. 4, 2007

(54) SYSTEM AND METHOD OF NOTIFYING UNPUBLISHED SUBSCRIBERS OF REQUEST FOR CONTACT INFORMATION

(75) Inventor: Jeffrey L. Strunk, Eustis, ME (US)

(73) Assignee: Wireless Directory Network, Inc., Carrabassett, ME (US)

( * ) Notice: Subject to any disclaimer, the term of this patent is extended or adjusted under 35 U.S.C. 154(b) by 59 days.

(21) Appl. No.: 10/820,614

(22) Filed: Apr. 8, 2004

(65) Prior Publication Data

US 2004/0203713 A1    Oct. 14, 2004

Related U.S. Application Data

(60) Provisional application No. 60/461,091, filed on Apr. 8, 2003.

(51) Int. Cl.
*H04Q 7/20* (2006.01)

(52) U.S. Cl. .............................. 455/414.1; 455/412.2; 455/406

(58) Field of Classification Search ............. 455/414.1, 455/412.2, 413, 403, 406; 379/67.1, 88.16, 379/88.19, 35, 88.2, 210.1, 211.01, 210.02, 379/218.01, 218.02, 201.01, 211.02, 142.02, 379/215.01, 88.12, 88.23, 114.01, 114.05
See application file for complete search history.

(56) References Cited

U.S. PATENT DOCUMENTS

| | | | |
|---|---|---|---|
| 5,809,114 A * | 9/1998 | Solomon et al. ......... 379/88.19 |
| 5,926,754 A * | 7/1999 | Cirelli et al. ............... 455/417 |
| 6,343,120 B1 | 1/2002 | Rhodes | |
| 6,463,131 B1 * | 10/2002 | French-St. George et al. ....................... 379/88.23 |
| 6,716,101 B1 * | 4/2004 | Meadows et al. ........ 455/456.1 |
| 6,868,268 B2 | 3/2005 | Worsham et al. | |
| 6,917,674 B2 * | 7/2005 | Gilbert .................. 379/201.11 |
| 2003/0007625 A1 * | 1/2003 | Pines et al. .................. 379/223 |
| 2003/0206616 A1 * | 11/2003 | Dowdy ....................... 379/67.1 |
| 2004/0190707 A1 | 9/2004 | Ljubicich | |
| 2005/0250483 A1 | 11/2005 | Malik | |

* cited by examiner

*Primary Examiner*—Jean Gelin
(74) *Attorney, Agent, or Firm*—Pierce Atwood LLP; Kevin M. Farrell; Katherine A. Wrobel

(57) ABSTRACT

A system and method in which unpublished subscribers of telecommunications services are able to receive a notification that an individual is trying to contact them, without revealing unpublished contact information. A requestor of a telecommunication subscriber's unpublished contact information is given an opportunity to indirectly send the subscriber a notification message. This is accomplished by collecting information from the requestor regarding the desired content of the notification message and then sending the notification message to the subscriber. The unpublished subscriber receiving such a notification message has the choice of contacting the requestor or ignoring the notification message.

14 Claims, 3 Drawing Sheets

SYSTEM AND METHOD OF NOTIFYING UNPUBLISHED SUBSCRIBERS OF REQUEST FOR CONTACT INFORMATION

CROSS REFERENCES TO RELATED APPLICATIONS

This application claims the benefit of U.S. Provisional Application No. 60/461,091, filed Apr. 8, 2003.

BACKGROUND OF THE INVENTION

This invention relates generally to telecommunications and more particularly to contacting subscribers of telecommunications services without revealing unpublished contact information.

Conventional landline telecommunications systems have been in existence for many years. Landline telecommunications involve the physical coupling through a conductive medium, such as a copper wire or optical fiber, between locations having transceiving equipment, such as telephones. Until fairly recently, most non-military communications have occurred via landlines. More recently, radio frequency-based communications have become commercially viable for the mass market. This form of analog or digital communication requires no physical conduction medium and so is termed "wireless." Wireless communications free the user from the obligation of remaining proximate to the base equipment associated with landline communications. Instead, signal transmission occurs via satellites, wireless booster towers, and miniaturized transceivers that form part of the mobile wireless communication equipment.

In order for communications to occur between two or more locations having telecommunications equipment, it has been necessary for at least one of those locations to know the contact information (telephone number, e-mail address, etc.) for the other location or locations to be contacted. This need gave rise to the development of databases or directories of contact information for specific telecommunications system-equipped locations. One obvious example of such a database or directory is the telephone book, which provides a listing of contact telephone numbers for individuals and businesses within a specified region. Additionally, local and national directory assistance providers generate and supply contact information upon telephonic request. In operation, communicators of directory assistance service providers retrieve from a series of database choices the information of interest and convey it to the interested party.

Some estimates indicate that as many as ten billion calls are made for directory assistance for telephone numbers per annum throughout the world, indicating the importance of such contact information. Further, as use of the Internet expands, alternative databases of telephone numbers, facsimile numbers, e-mail addresses, web site addresses, and the like are made accessible by way of computer devices, such as personal computers. Necessarily, given the scope of interest in obtaining such contact information telephonically and by computer, the value of directory assistance providers has increased.

However, many subscribers of telecommunications service wish to prevent widespread dissemination of their contact information for various reasons such as privacy concerns, desire to prevent unsolicited calls, etc. Telecommunications service providers accommodate these subscribers by not publishing their contact information. Unpublished or "unlisted" contact information cannot be disseminated by directory assistance providers, meaning that directory assistance requestors of unpublished information are denied access to the contact information.

Accordingly, it would be desirable to have a system and method in which unpublished subscribers (i.e., subscribers for whom contact information is not published) can be contacted without revealing the unpublished contact information.

SUMMARY OF THE INVENTION

The above-mentioned need is met by the present invention, which provides a system and method in which unpublished subscribers of telecommunications services are able to receive a notification that an individual is trying to contact them, via directory assistance or a web-based request. The notification can be marked as being an emergency, urgent business, personal or other. The unpublished subscriber receiving such a notification has the choice to call back or ignore the request. The system provides the notification without revealing the unpublished contact information.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
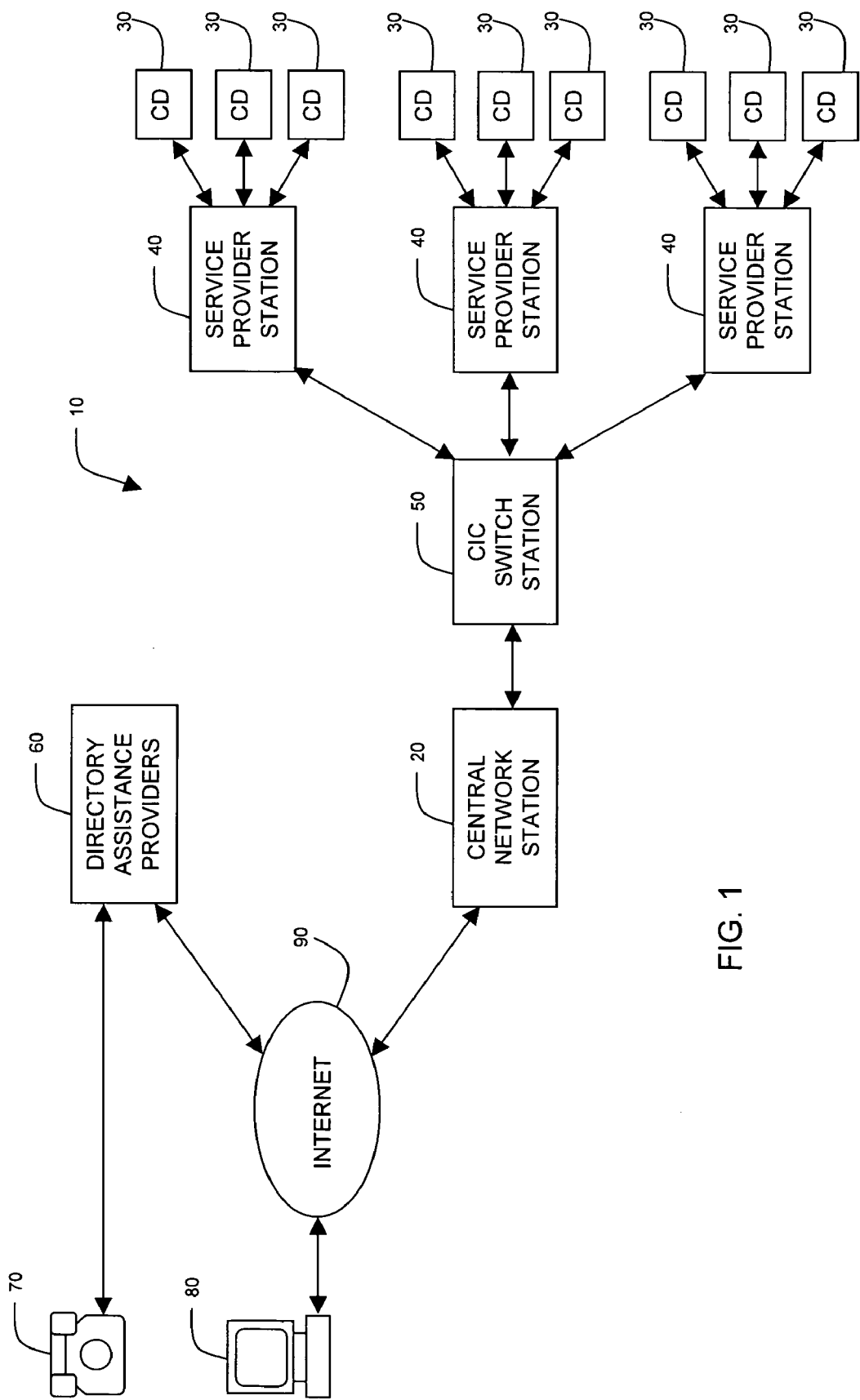
FIG. 1 is a schematic block diagram of a first embodiment of a subscriber notification system.

Referring to the drawings wherein identical reference numerals denote the same elements throughout the various views, FIG. 1 shows a first embodiment of a telecommunications system 10 for sending unpublished subscribers a secure notification message (in the form of a text message) that a request has been made for their unpublished contact information. The system 10 includes a central network station 20. The network station 20 is a computing device (or a coordinated collection of plural computing devices) having mass storage capability and means for carrying out software-based instructions. The network station 20 is preferably a minicomputer or a mainframe computer but is not limited thereto. The network station 20 is programmable to receive and store contact information including, but not limited to, the access numbers of any of a plurality of communication devices 30 (identified by the abbreviation "CD" in the drawings) used by subscribers of various service providers and contact-identifying information associated with those numbers, e.g., the subscriber's name and address. The system 10 can operate with any number of telecommunications service providers, represented in FIG. 1 by service provider database or local exchange carrier stations 40. Each service provider station 40 is typically associated with a multitude of the subscriber communication devices 30. In this embodiment, the subscriber communication devices 30 can be any type of communications device (landline telephone, wireless telephone, pager, etc.) capable of receiving text messages.

The contact information corresponding to each communication device 30 is obtained by the network station 20 through the respective service provider stations 40. The network station 20 preferably includes telecommunications routing and switching equipment so as to be capable of operating as a telecommunications station. Therefore, the network station is assured of gaining access to the contact information of the service providers' subscribers because it is a matter of legislative obligation that such service providers provide to any other telecommunications service provider the contact information of its subscribers. The system 10 includes a router/Communicator Identification Code (CIC) switch station 50 that enables the central network station 20 to interface with the service provider stations 40.

The contact information received by the central network station 20 from the service provider stations 40 is formatted as necessary to enable various directory assistance service providers (collectively represented in FIG. 1 by a single site 60, although it should be understood that multiple directory assistance service providers can interface with the central network station 20) to interface with the network station 20 and query it for contact information, possibly in exchange for a fee. The manipulation of that information results in a unified database of telecommunications device users. In effect, the network station 20 is a routing, switching, data storage, and interface system. All communications with the various stations to which the central station 20 is coupled may occur through digital, analog, T1, T3, CAT5, frame-based data transport protocols, asynchronous mode transport protocols, among others. The central network station 20 periodically polls the service provider stations 40 (preferably one or more times per day) and is continuously accessible by directory assistance provider contact sites 60 worldwide so as to provide essentially real-time contact information.

Directory assistance providers can provide individual users access to the system 10 through a variety of means. Two primary directory assistance access means include a "call center" approach in which a user or requestor contacts the directory assistance provider contact site 60 directly by calling the site 60 with a landline or wireless telephone 70 and a "web portal" approach in which the requestor uses a web-enabled device 80 such as a personal computer, PDA, web-enabled wireless phone or the like to contact the site 60 via the Internet 90 (or other computer network). Alternatively, a requestor can directly access a web portal provided on the central network station 20 using the web-enabled device 80. It should be noted that the directory assistance provider contact sites 60 could also connect to the central network station 20 via the Internet 90.

The components of the system 10 described herein operate in conjunction such that contact information may be transmitted, stored, or retrieved, or any combination thereof. Means such as software is employed to establish the inter-relationships among the network station 20, subscriber communication devices 30, service provider stations 40, and directory assistance provider contact sites 60. Those skilled in the art of software development will readily ascertain the details of programming the exchange of information based upon the following exemplar representation of the operation of the system 10.

In operation, a requester contacts the directory assistance provider contact site 60 using the telephone 70 or web-enabled device 80 (or any other suitable means) to request the contact information (such as wireless number, landline number, fax number, email address, shipping address, vacation number, temporary number, emergency number, personal directory number, and pager number) of a particular telecommunications service subscriber. The directory assistance provider contact site 60 then interfaces with the central network station 20 to search the collection of subscriber contact information stored therein. If that particular subscriber's contact information is published, then the direct assistance provider simply provides the requested information in the normal manner. However, if that particular subscriber's contact information is unpublished (i.e., unlisted), then the directory assistance provider will notify the requestor that the requested information is unpublished and cannot be given out. The directory assistance provider will also provide the requester with an opportunity to indirectly send the particular subscriber a secure notification message (in the form of a text message) preferably, but not necessarily, in exchange for a fee. Through the notification message, the requestor will be able to communicate to the subscriber a request that the subscriber contact the requester.

Another possible feature of the present invention would be to give unpublished subscribers the option of electing not to receive any notification messages. Unpublished subscribers electing this option would be identified in the system as being "locked out." In this case, when a request is made for the contact information of an unpublished subscriber having locked out status, the directory assistance provider will simply notify the requestor that the requested information is unpublished and cannot be given out. The requestor will be not given an opportunity to indirectly send the particular subscriber a secure notification message.

If the requestor declines the offer to indirectly send a notification message, then the process stops at that point. If the requestor accepts the offer to indirectly send a notification message, the information relating to the notification message is collected. Specifically, the content of the notification message is ascertained. This is preferably done through a notification message screen generated by the central network station 20. If the requestor has contacted the directory assistance provider contact site 60 using the telephone 70, then the notification message screen appears to the directory assistance operator (who has accessed the network station 20 via the Internet). The directory assistance operator obtains the pertinent message information from the requestor over the telephone connection and enters this information into the notification message screen. If the requester has contacted the directory assistance provider contact site 60 using the web-enabled device 80, then the notification message screen appears on the display of the web-enabled device 80 and the requestor enters the pertinent message information directly into the notification message screen. The later process would be the case regardless of whether the requestor accessed the system via a web portal operated by the directory assistance provider or a web portal running on the central network station 20.

Figure 2:
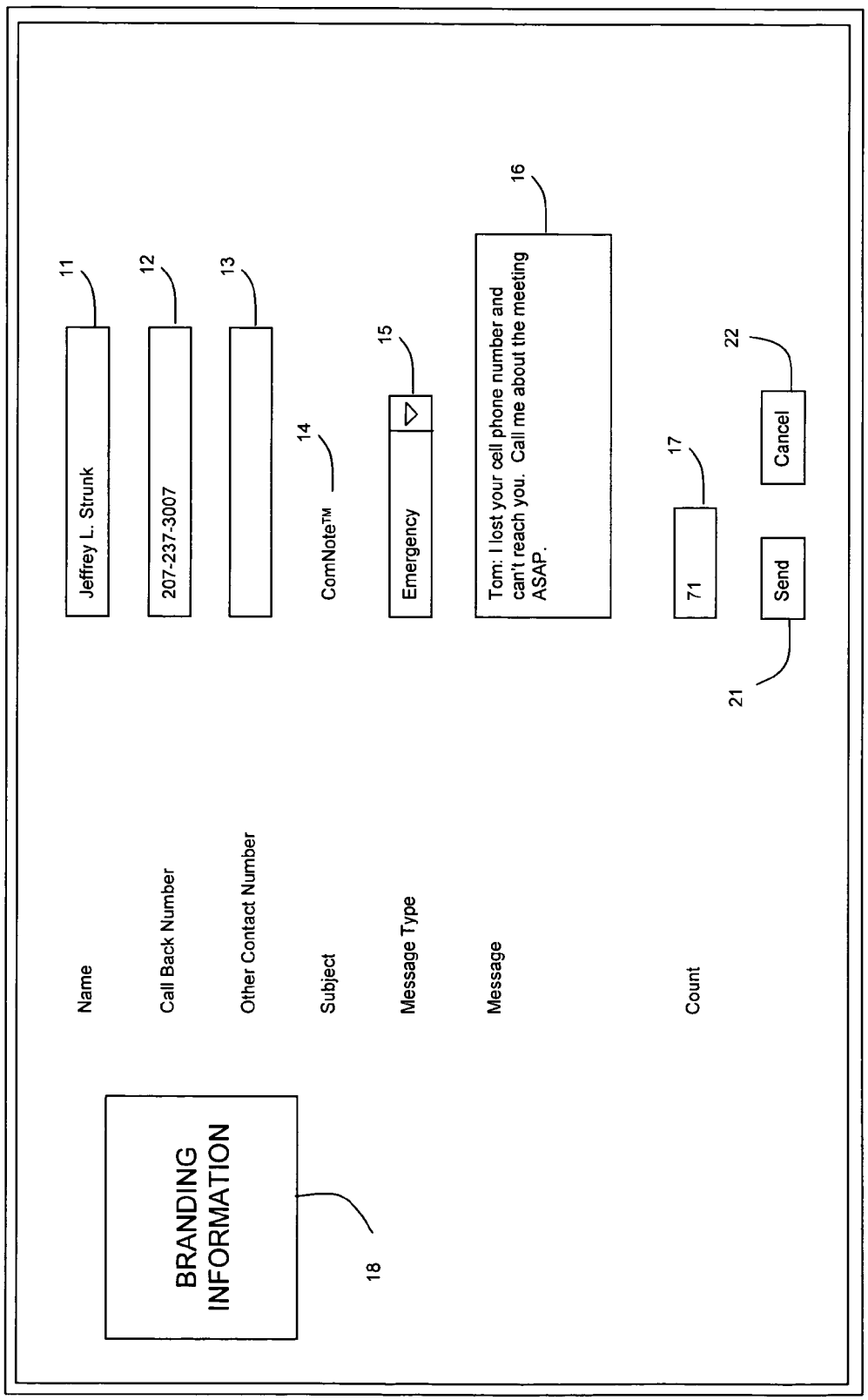
FIG. 2 depicts a representative notification message screen.

FIG. 2 shows a representative notification message screen. The notification message screen has a number of text boxes in which the requestor/directory assistance operator is able to enter information about the notification message. These boxes include: a Name box 11 in which the requestor's name is entered, a Call Back Number box 12 in which an access number (e.g., for a telephone, pager or the like) at which the requestor can be reached is entered, and a Secondary Call Back Number box 13 in which an additional access number at which the requestor can be reached can be entered. The notification message screen also includes a Subject box 14 in which a brief message identifier is entered; the Subject box 14 can be set up to always display a brand identifier for the notification messaging service. A Message Type box 15 is provided for tagging the type of message. This can be in the form of a pull-down menu having numerous tag options such as Emergency, Urgent, Personal, and Business. A Message box 16 is provided in which the text message the requestor wishes to relay to the subscriber is entered. The notification message screen also includes a Count box 17 that displays a running total of the alphanumeric characters of the message entered in the Message box 16. This count is useful to the requestor/directory assistance operator when entering the message because text messages are generally limited to a maximum number of alpha-numeric characters (typically 150 characters). The notification message screen can include branding information 18, as shown in the upper right corner, such as service provider logos and such.

The notification message screen includes a Send button 21 and a Cancel button 22. Once all of the message information has been entered, the requestor/directory assistance operator selects or "clicks on" the Send button 21 to send the notification message. The Cancel button 22 can be clicked at anytime prior to clicking the Send button 21 to cancel the message. When the Send button 21 is clicked, the notification message screen is replaced on the directory assistance operator display or the display of the web-enabled device 80, depending on by which means the requestor has accessed the system 10, with a confirmation screen. The confirmation screen gives the requestor a last opportunity to cancel the message or to send the message and to accept the charges if a fee is applied.

To send the message, the central network station 20 identifies the subscriber's telecommunications service provider and access number from the information stored in the network station 20. The network station 20 then sends an e-mail containing the notification message to the subscriber's access number at the telecommunications service provider's text messaging domain. Any form of text messaging, such as SMS (Short Messaging Service), can be employed. The e-mail travels over the Internet backbone to the telecommunications service provider's text messaging domain. At the telecommunications service provider's text messaging domain, the e-mail is transmitted over the appropriate communication network (e.g., CDMA, TDMA, GSM, etc.) to the subscriber's communication device 30. The intended subscriber thus receives the notification message. Because the e-mail containing the notification message originated at the central network station 20, the unpublished contact information is not revealed to the requestor and is thus secure.

In many instances, the central network station 20 will be able to obtain or have access to the subscriber's regular e-mail address. In such cases, the central network station 20 could optionally send an e-mail containing the notification message to the subscriber's regular e-mail address in addition to the text message sent to the subscriber's communication device 30. The additional e-mail notification would thus serve as a supplement or back-up to the text message.

The contact information received by the central network station 120 from the service provider stations 140 is formatted as necessary to enable various directory assistance service providers (collectively represented in FIG. 3 by a single site 160, although it should be understood that multiple directory assistance service providers can interface with the central network station 120) to interface with the network station 120 and query it for contact information, possibly in exchange for a fee. The directory assistance provider contact sites 160 preferably interface with the central network station 20 via the Internet. The manipulation of that information results in a unified database of telecommunications device users. In effect, the network station 120 is a routing, switching, data storage, and interface system. All communications with the various stations to which the central station 120 is coupled may occur through digital, analog, T1, T3, CAT5, frame-based data transport protocols, asynchronous mode transport protocols, among others. The central network station 120 periodically polls the service provider stations 140 (preferably one or more times per day) and is continuously accessible by directory assistance provider contact sites 160 worldwide so as to provide essentially real-time contact information.

Figure 3:
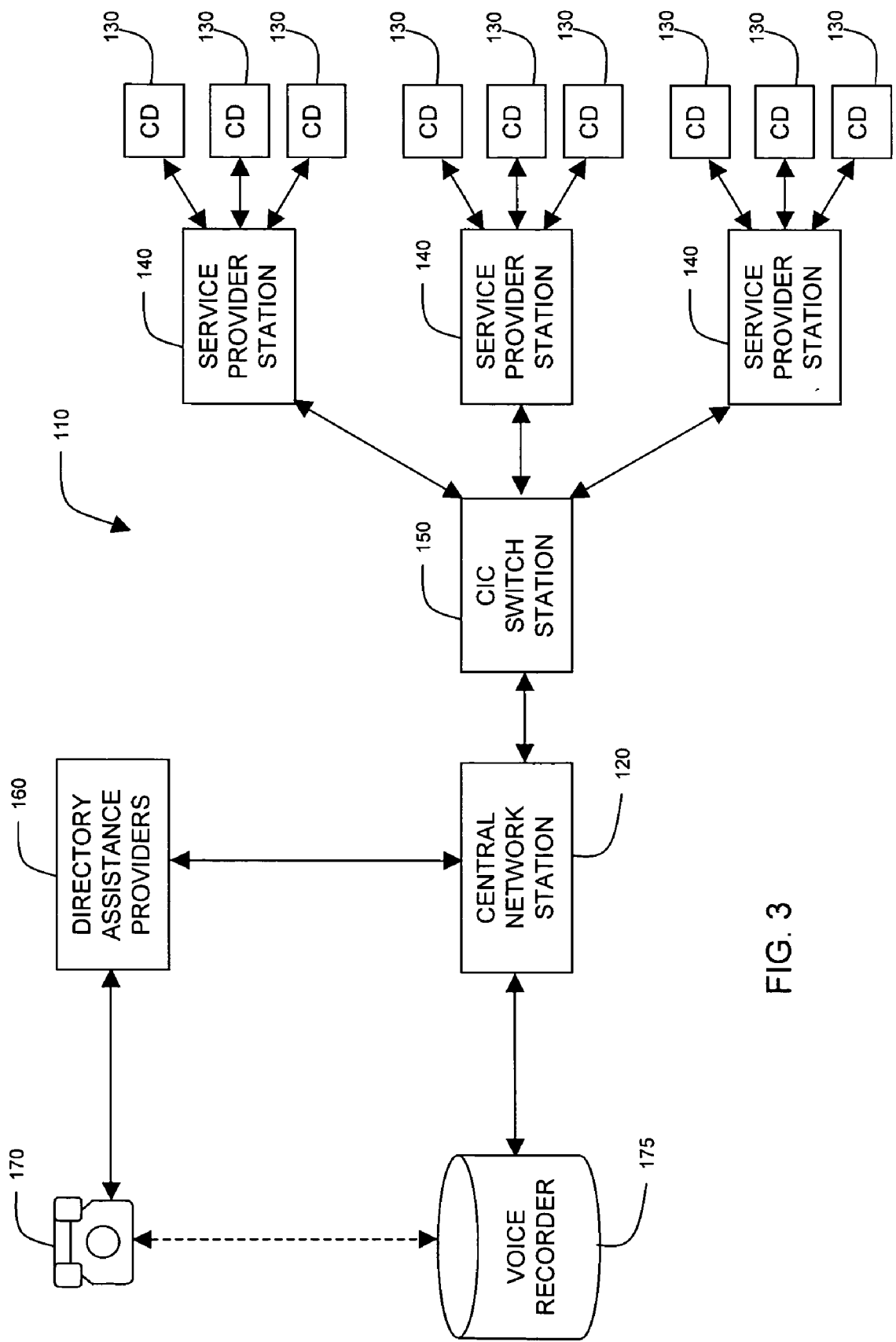
FIG. 3 is a schematic block diagram of a second embodiment of a subscriber notification system.

Referring now to FIG. 3, a second embodiment of a telecommunications system 110 for sending unpublished subscribers a secure notification message (at least partially in the form of a voice message) that a request has been made for their unpublished contact information. The system 110 includes a central network station 120. The network station 120 is a computing device (or a coordinated collection of plural computing devices) having mass storage capability and means for carrying out software-based instructions. The network station 120 is preferably a minicomputer or a mainframe computer but is not limited thereto. The network station 120 is programmable to receive and store contact information including, but not limited to, the access numbers of any of a plurality of communication devices 130 used by subscribers of various service providers and contact-identifying information associated with those numbers, e.g., the subscriber's name and address. The system 110 can operate with any number of telecommunications service providers, represented in FIG. 3 by service provider database or local exchange carrier stations 140. Each service provider station 140 is associated with a multitude of the subscriber communication devices 130. In this embodiment, the subscriber communication devices 130 can be any type of communications device (landline telephone, wireless telephone, pager, etc.) capable of receiving voice mail messages.

The contact information associated with the subscriber communication devices 130 is obtained by the network station 120 through the respective service provider stations 140. The network station 120 preferably includes telecommunications routing and switching equipment so as to be capable of operating as a telecommunications station. Therefore, the network station 120 is assured of gaining access to the contact information of the service providers' subscribers because it is a matter of legislative obligation that such service providers provide to any other telecommunications service provider the contact information of its subscribers. The system 110 includes a router/Communicator Identification Code (CIC) switch station 150 that enables the central network station 120 to interface with the service provider stations 140.

The contact information received by the central network station 120 from the service provider stations 140 is formatted as necessary to enable various directory assistance service providers (collectively represented in FIG. 3 by a single site 160, although it should be understood that multiple directory assistance service providers can interface with the central network station 120) to interface with the network station 120 and query it for contact information, possibly in exchange for a fee. The directory assistance provider contact sites 160 preferably interface with the central network station 120 via the Internet. The manipulation of that information results in a unified database of telecommunications device users. In effect, the network station 120 is a routing, switching, data storage, and interface system. All communications with the various stations to which the central station 120 is coupled may occur through digital, analog, T1, T3, CAT5, frame-based data transport protocols, asynchronous mode transport protocols, among others. The central network station 120 periodically polls the service provider stations 140 (preferably one or more times per day) and is continuously accessible by directory assistance provider contact sites 160 worldwide so as to provide essentially real-time contact information.

In this embodiment, directory assistance providers provide individual users access to the system 110 through a "call center" approach in which a user or requester contacts the directory assistance provider contact site 160 directly by calling the site 160 with a landline or wireless telephone 170. The system 110 further includes a voice recorder 175 that interfaces with the central network station 120. The purpose of the voice recorder 175 is described below.

The components of the system 110 described herein operate in conjunction such that contact information may be transmitted, stored, or retrieved, or any combination thereof. Means such as software is employed to establish the interrelationships among the network station 120, subscriber communication devices 130, service provider stations 140, directory assistance provider contact sites 160, and voice recorder 175. Those skilled in the art of software development will readily ascertain the details of programming the exchange of information based upon the following exemplar representation of the operation of the system 110.

In operation, a requestor contacts the directory assistance provider contact site 160 using the telephone 170 to request the contact information (such as wireless number, landline number, fax number, email address, shipping address, vacation number, temporary number, emergency number, personal directory number, and pager number) of a particular telecommunications service subscriber. The directory assistance provider contact site 160 then interfaces with the central network station 120 to search the collection of subscriber contact information stored therein. If that particular subscriber's contact information is published, then the direct assistance provider simply provides the requested information in the normal manner. However, if that particular subscriber's contact information is unpublished (i.e., unlisted), then the directory assistance provider will notify the requester that the requested information is unpublished and cannot be given out. The directory assistance provider will also provide the requestor with an opportunity to indirectly send the particular subscriber a secure notification message (at least partially in the form of a voice message) preferably, but not necessarily, in exchange for a fee. Through the notification message, the requestor will be able to communicate to the subscriber a request that the subscriber contact the requestor.

If the requestor declines the offer to indirectly send a notification message, then the process stops at that point. If the requestor accepts the offer to indirectly send a notification message, the directory assistance provider connects the requestor to the voice recorder 175, as represented by the dashed line in FIG. 3. The requestor is then prompted to record a notification message for the subscriber, including one or more call back numbers that the requestor can be reached at, and then press a certain key on the telephone 170 when finished with the message. When the requestor presses the predetermined key, he or she will be able to use various other keys on the telephone 170 to select options such as save and send the message, rerecord the message, enter a reply phone number, and delete the message. When the requestor opts to send the notification message, he or she can be given a last opportunity to confirm the choice to send the message and to accept the charges if a fee is applied.

To send the message, the central network station 120 identifies the subscriber's telecommunications service provider and access number from the information stored in the network station 120. The network station 120 then sends an e-mail indicating that the subscriber has a notification message to the subscriber's access number at the telecommunications service provider's text messaging domain. Any form of text messaging, such as SMS (Short Messaging Service), can be employed. The e-mail travels over the Internet backbone to the telecommunications service provider's text messaging domain. At the telecommunications service provider's text messaging domain, the e-mail is transmitted over the appropriate communication network (e.g., CDMA, TDMA, GSM, etc.) to the subscriber's communication device 130. The intended subscriber thus receives a text message indicating that he or she has a voice-recorded notification message. Because the e-mail originated at the central network station 120, the unpublished contact information is not revealed to the requester and is thus secure.

When the subscriber receives the text message on the communication device 130, he or she has the option of ignoring the message, listening to the voice message or connecting to the reply number. If the subscriber elects to listen to the voice message, the communication device 130 is connected to the network station 120. The network station 120 verifies the subscriber by recognizing the communication device 130 through Caller ID or by requesting the subscriber to enter the access number of the communication device 130. After verification, the network station 120 connects the subscriber to the voice message on the voice recorder 175 and instructs the subscriber to press a particular key on the communication device 130. When the subscriber presses the particular key, he or she will be able to use various other keys on the communication device 130 to select options such as repeat the message, save the message, and connect to the requestor without disclosing the contact information.

Generally, the subscriber receiving a notification message is not charged a fee. However, the subscriber could be charged a fee for being connected to the requestor without disclosing the subscriber's contact information.

The second embodiment can also be used as an alternative voice mail system for subscribers of telecommunications services, particularly telephone service. This usage is applicable to subscribers having published contact information as well as unpublished subscribers. As is well known, voice mail service allows a subscriber to receive voice recorded messages when his or her telephone is turned off, busy, or not answered. Typically, subscribers are charged an additional monthly fee for voice mail service. The system 110 can be implemented such that subscribers, both published and unpublished, can receive voice recorded messages while avoiding additional monthly fees. Specifically, when an incoming call to a communication device 130 is not answered for whatever reason (e.g., the number is busy, the telephone is turned off, etc.), the caller would be connected to the voice recorder 175. The caller is then prompted to record a message for the subscriber (typically for a fee), in the same manner as that described above with respect to a directory assistance requester. When the caller finishes the message recording process, the system 110 operates in the same manner described above to send the subscriber a text message that he or she has a voice-recorded message. The subscriber can then retrieve the message, if desired, in the same manner described above. This alternative usage of system 110 can also be employed by having directory assistance providers provide directory assistance requestors of published with an opportunity to indirectly send the subscriber a voice-recorded message, preferably in exchange for a fee.

While specific embodiments of the present invention have been described, it will be apparent to those skilled in the art that various modifications thereto can be made without departing from the spirit and scope of the invention as defined in the appended claims.

What is claimed is:

1. A method for sending a notification message to a telecommunication subscriber without revealing unpublished contact information, said method comprising:

providing a requestor of unpublished contact information of a telecommunication subscriber an opportunity to indirectly send said subscriber a notification message in electronic form, the notification message being entered on a web-enabled device by the requestor or conveyed by voice to a directory assistance operator by the requestor and subsequently transcribed into electronic form to provide the notification message in electronic form; and sending said notification message to said subscriber by text messaging and charging a fee to said requestor for sending the notification message.

2. The method of claim 1, further comprising sending an e-mail containing said notification message to said subscriber as a supplement to the notification message sent by text messaging.

3. The method of claim 1 wherein providing a requestor of unpublished contact information of a telecommunication subscriber an opportunity to indirectly send said subscriber a notification message in electronic form includes allowing said requestor to provide information via a landline or wireless telephone.

4. The method of claim 1 wherein providing a requestor of unpublished contact information of a telecommunication subscriber an opportunity to indirectly send said subscriber a notification message in electronic form includes allowing said requestor to provide information via a computer network and a web-enabled device.

5. The method of claim 4 wherein providing a requestor of unpublished contact information of a telecommunication subscriber an opportunity to indirectly send said subscriber a notification message in electronic form further includes causing a notification message screen to be displayed on said web-enabled device.

6. The method of claim 5 wherein said notification message screen includes a text box in which the text of said notification message is entered.

7. The method of claim 6 wherein said notification message screen includes additional text boxes in which said requestor's name and access number are entered.

8. A system for sending a notification message to a telecommunication subscriber without revealing unpublished contact information, said system comprising:

means for a requestor of unpublished contact information to request the telecommunication subscriber contact information;

means for providing the requestor of unpublished contact information of a telecommunication subscriber an opportunity to indirectly send said subscriber a notification message in electronic form, the notification message being entered on a web-enabled device by the requestor or conveyed by voice to a directory assistance operator by the requestor and subsequently transcribed into electronic form to provide the notification message in electronic form; and means for sending said notification message to said subscriber by text messaging and charging a fee to said requestor for sending the notification message.

9. The system of claim 8, further comprising means for sending an e-mail containing said notification message to said subscriber as a supplement to said notification message sent by text messaging.

10. The system of claim 8 wherein said means for providing a requestor of unpublished contact information of a telecommunication subscriber an opportunity to indirectly send said subscriber a notification message in electronic form includes means for allowing said requestor or directory assistance operator to provide information via a landline or wireless telephone.

11. The system of claim 8 wherein said means for providing a requestor of unpublished contact information of a telecommunication subscriber an opportunity to indirectly send said subscriber a notification message in electronic form includes means for allowing said requestor or directory assistance operator to provide information via a computer network and a web-enabled device.

12. The system of claim 11 wherein said means for allowing said requestor or directory assistance operator to provide information via a computer network and a web-enabled device further includes means for causing a notification message screen to be displayed on said web-enabled device.

13. The system of claim 12 wherein said notification message screen includes a text box in which the text of said notification message is entered.

14. The system of claim 13 wherein said notification message screen includes additional text boxes in which said requestor's name and access number are entered.

* * * * *